United States Patent
Zhong et al.

(10) Patent No.: US 11,493,923 B2
(45) Date of Patent: Nov. 8, 2022

(54) PATH PLANNING METHOD AND SYSTEM FOR LAWN MOWER

(71) Applicant: Chongqing Rato Intelligent Equipment Co., LTD., Chongqing (CN)

(72) Inventors: Wei Zhong, Chongqing (CN); Zhe Niu, Chongqing (CN); Bo Ding, Chongqing (CN); Xun Xu, Chongqing (CN); Yuanyuan Chen, Chongqing (CN); Qian Xu, Chongqing (CN); Lei Zhou, Chongqing (CN); Yi Zhou, Chongqing (CN)

(73) Assignee: CHONGQING RATO INTELLIGENT EQUIPMENT CO., LTD., Chongqing (CN)

( * ) Notice: Subject to any disclaimer, the term of this patent is extended or adjusted under 35 U.S.C. 154(b) by 353 days.

(21) Appl. No.: 16/749,890

(22) Filed: Jan. 22, 2020

(65) Prior Publication Data

US 2020/0159228 A1    May 21, 2020

(30) Foreign Application Priority Data

Jan. 22, 2019   (CN) .......................... 201910060770.8

(51) Int. Cl.
  *G05D 1/02*   (2020.01)
  *A01D 34/00*   (2006.01)
  (Continued)

(52) U.S. Cl.
  CPC ......... *G05D 1/0212* (2013.01); *A01D 34/008* (2013.01); *G05D 1/0088* (2013.01);
  (Continued)

(58) Field of Classification Search
  CPC .. G05D 1/0212; G05D 1/0219; G05D 1/0274; G05D 2201/0208; G05D 1/0088;
  (Continued)

(56) References Cited

U.S. PATENT DOCUMENTS

| | | | |
|---|---|---|---|
| 2012/0166019 A1* | 6/2012 | Anderson | G05D 1/0274 701/1 |
| 2018/0004217 A1* | 1/2018 | Biber | G05D 1/0221 |
| 2019/0163174 A1* | 5/2019 | Ko | G05D 1/0219 |

FOREIGN PATENT DOCUMENTS

| | | | |
|---|---|---|---|
| CN | 106643719 A | * | 5/2017 |
| TW | 200829155 A | * | 7/2008 |

(Continued)

OTHER PUBLICATIONS

Hameed; Coverage Path Planning Software for Autonomous Robotic Lawn Mower using Dubin's Curve; Proc. of the 2017 IEEE Intl. Conf. on Real-time Computing and Robotics; Jul. 14-18, 2017; Okinawa Japan; pp. 517-522 (Year: 2017).*

Primary Examiner — Michael J Zanelli
(74) Attorney, Agent, or Firm — Cheng-Ju Chiang

(57) ABSTRACT

The present disclosure relates to the field of intelligent lawn mowers and logic control technologies thereof, and discloses a path planning method for an intelligent lawn mower. The path planning method includes: starting a touch panel of the intelligent lawn mower; entering a path planning setting interface, which displays a schematic diagram of a region to be mowed, a path angle indicating image and a path angle setting image; receiving a touch input of a user with respect to the path angle setting image to set a path angle; adjusting, based on the set path angle, the path angle indicating image for display; and re-planning a path of the intelligent lawn mower based on the set path angle and a preset algorithm.

(Continued)

The present disclosure further provides a path planning system for the intelligent lawn mower.

10 Claims, 10 Drawing Sheets

(51) Int. Cl.
*G05D 1/00* (2006.01)
*G06F 3/0482* (2013.01)
*A01D 101/00* (2006.01)

(52) U.S. Cl.
CPC ........ *G06F 3/0482* (2013.01); *A01D 2101/00* (2013.01); *G05D 2201/0208* (2013.01)

(58) Field of Classification Search
CPC .. A01D 34/008; A01D 2101/00; G06F 3/0482
See application file for complete search history.

(56) References Cited

FOREIGN PATENT DOCUMENTS

| | | | | |
|---|---|---|---|---|
| WO | WO-2014003644 A2 | * | 1/2014 | ............ B25J 11/008 |
| WO | WO-2019096262 A | * | 5/2019 | |

* cited by examiner

PATH PLANNING METHOD AND SYSTEM FOR LAWN MOWER

TECHNICAL FIELD

The present disclosure relates to the field of intelligent lawn mowers and logic control technologies thereof, and in particular to a path planning method and system for a lawn mower.

BACKGROUND

Due to the rapid development of science and technology, especially the advancement of computer technology and artificial intelligence science, robots have been widely used in various fields such as industry, aerospace and agriculture. In recent years, with the vigorous development of greening construction and the increase of urban public green space, the demand for lawn restoration also has been increasing gradually.

As a garden service robot, a mowing robot is widely used as one of agricultural robots. Since the 1980s, many companies at home and abroad have invested a lot in the research of intelligent lawn mowers and achieved some fruitful results. Generally, the intelligent mowing robot works in a relatively closed region, and requires sufficient intelligence to autonomously complete path planning and to finish mowing of the entire region at a lower repetitive rate. This path planning is a complete-coverage path planning algorithm. As a kind of path planning, the complete-coverage path planning requires a path that can completely cover the entire reachable region. This kind of complete-region traversal algorithm is of great significance for research, and is mainly applied to marine search and rescue, mineral exploration, defense mine clearance, etc.

The demands of greening construction cannot be met as a common intelligent lawn mower is poor in performance and manual mowing is low in efficiency, causing adverse effects to staff and residents. With the research and development of intelligent lawn mowers, many problems have been solved for people. At present, evaluation indexes for the complete-region traversal algorithm generally include: a repetitive rate, a coverage rate, time consumption, etc. It is not difficult to know about the following problems of traditional path planning after analysis of difficulties in the path planning technology of the intelligent lawn mower on the basis of these indexes.

A stochastic planning algorithm is low in efficiency and unsatisfactory in path planning, and requires repeated cleaning to achieve a high coverage.

An SLAM-based path planning method takes a lot of operation time, requires the support of a large amount of hardware funding, has the key point of requiring feature points, and thus is not suitable for some special occasions such as golf courses.

An artificial potential field method has a simple structure, but it falls into local optimum easily, resulting in intermittence of mowing areas. Finally, repeated mowing is performed, which leads to low efficiency.

A heuristic algorithm needs pre-defining of very suitable heuristic rules, and thus is not suitable for large-scale applications.

SUMMARY

An objective of the present disclosure is to solve the above-mentioned problems by providing a path planning method for a lawn mower. In consideration of running modes in sub-regions, segmentation of the sub-regions and connection between the sub-regions, an entire mowing region is traversed in an optimal path.

The present disclosure adopts the following technical solution: a path planning method for an intelligent lawn mower includes:

starting a touch panel of the intelligent lawn mower;

entering a path planning setting interface, which displays a schematic diagram of a region to be mowed, a path angle indicating image and a path angle setting image;

receiving a touch input of a user with respect to the path angle setting image to set a path angle;

adjusting, based on the set path angle, the path angle indicating image for display; and re-planning a path of the intelligent lawn mower based on the set path angle and a preset algorithm.

The present disclosure further provides a path planning system for an intelligent lawn mower, including:

a display module, configured to display a path planning setting interface, a schematic diagram of a region to be mowed, a path angle indicating image and a path angle setting image;

an input module, configured to receive a gesture input of a user with respect to the path angle setting image by a touch panel of the intelligent lawn mower to set a path angle; and a controller, configured to adjust, based on the set path angle set by the input module, the path angle indicating image for display, and to re-plan a path of the intelligent lawn mower based on a preset algorithm.

The present disclosure has the following beneficial effects:

(1) the path planning method and system for the lawn mower are simple in operation, easy to implement, low in consumption of hardware resources and high in operation speed, and the automatically planned path is high in reliability;

(2) with a low-cost sensor, a very high coverage rate can be achieved within a certain region, and running modes in units, segmentation of the units and connection between the units are drawn into consideration to traverse an entire mowing region in an optimal path; and (3) a self-defined mowing direction is provided, such that path planning information of automatic tasks in different paths can be generated.

DETAILED DESCRIPTION

Specific embodiments of a path planning method for a lawn mower of the present disclosure will be described in detail below with reference to the drawings.

Figure 1:
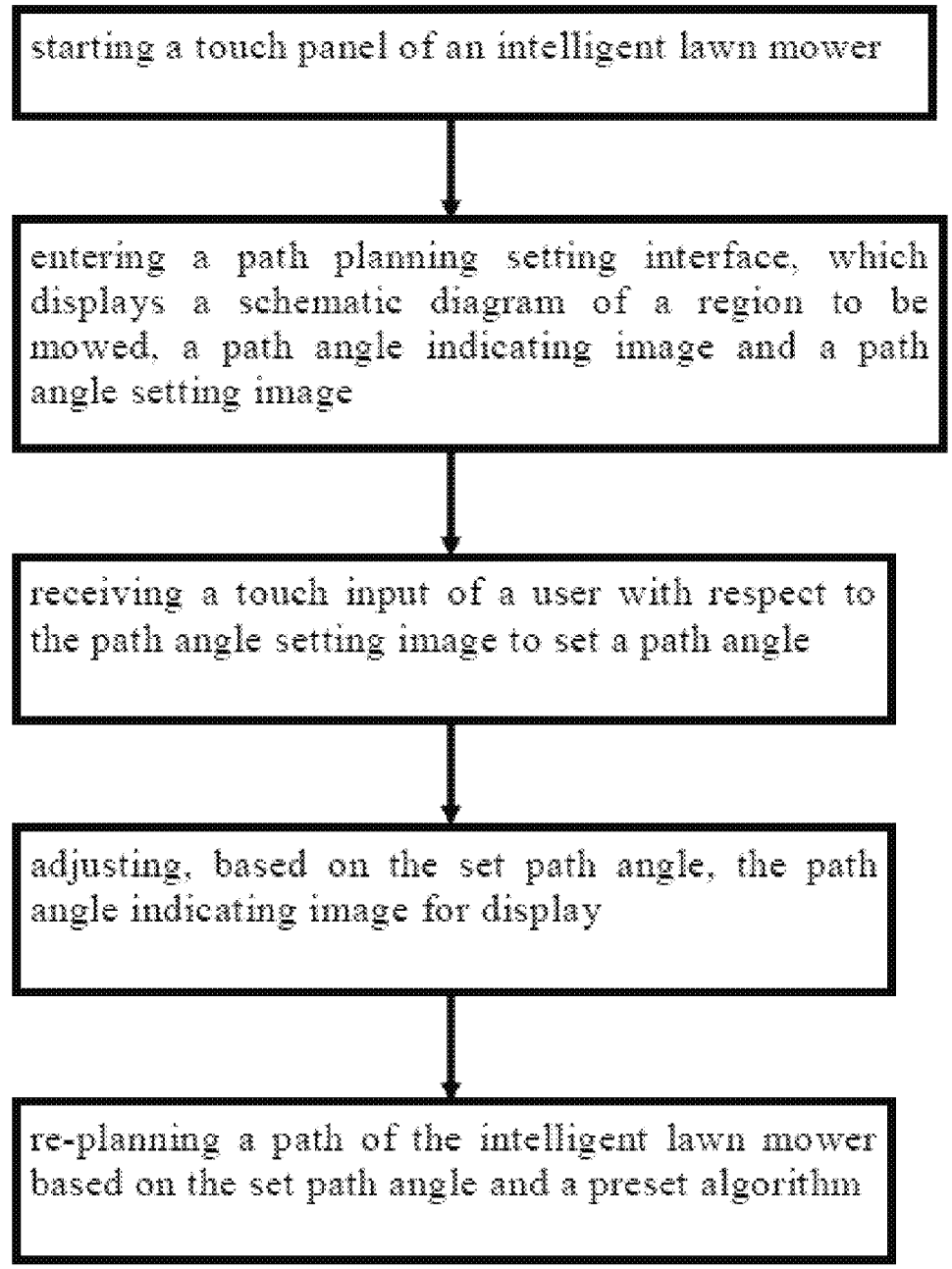
FIG. 1 is a flow chart of a path planning method for a lawn mower according to a preferred embodiment of the present disclosure.

Refer to FIG. 1, which is a flow chart of a path planning method for an intelligent lawn mower according to a preferred embodiment of the present disclosure. According to the preferred embodiment, the path planning method for the intelligent lawn mower includes the following steps.

In step a, a touch panel of the intelligent lawn mower is started.

In step b, a path planning setting interface is entered, and displays a schematic diagram of a region to be mowed, a path angle indicating image and a path angle setting image.

In step c, a touch input of a user with respect to the path angle setting image to set a path angle is received.

In step d, based on the set path angle, the path angle indicating image is adjusted for display.

In step e, a path of the intelligent lawn mower is re-planned based on the set path angle and a preset algorithm.

The path angle indicating image and the path angle setting image are the same. Meanwhile, re-planning the path of the intelligent lawn mower based on the set path angle and the preset algorithm particularly includes: re-planning the path of the intelligent lawn mower based on the set path angle and the preset algorithm, and displaying a mowing path schematic diagram on the touch panel. The schematic diagram of the region to be mowed is constituted by a plurality of grids of which the sizes are half to twice of the size of the lawn mower. The schematic diagram of the region to be mowed includes region boundary information and obstacle boundary information.

Figure 2:
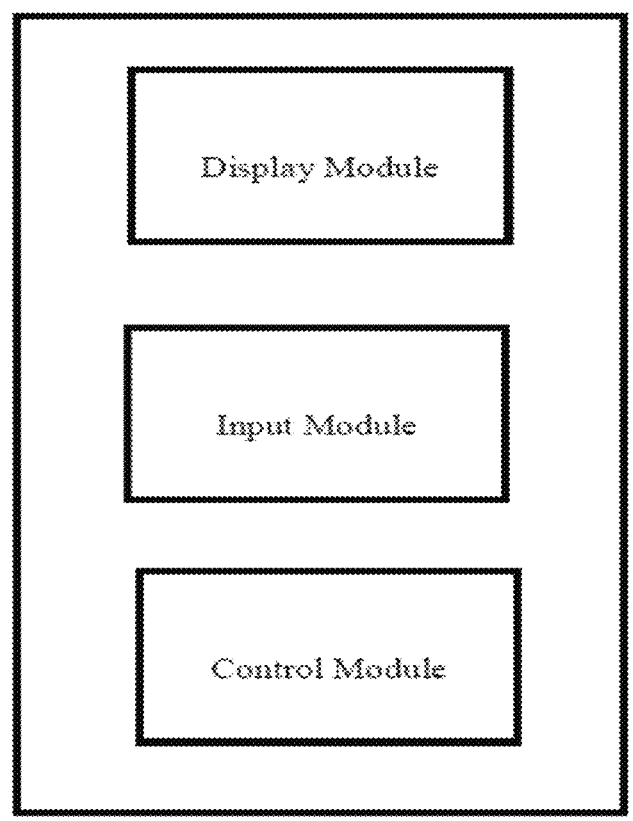
FIG. 2 is a block diagram of a path planning system for an intelligent lawn mower according to a preferred embodiment of the present disclosure.

Continuously refer to FIG. 2, which is a block diagram of a path planning system for an intelligent lawn mower according to a preferred embodiment of the present disclosure. According to the preferred embodiment, the path planning system for the intelligent lawn mower includes a display module, an input module and a controller. The display module is configured to display a path planning setting interface, a schematic diagram of a region to be mowed, a path angle indicating image and a path angle setting image. The input module is configured to receive a gesture input of a user with respect to the path angle setting image by a touch panel of the intelligent lawn mower to set a path angle. The controller is configured to adjust, based on the path angle set by the input module, the path angle indicating image for display, and to re-plan a path of the intelligent lawn mower based on a preset algorithm.

In the present embodiment, the path angle indicating image and the path angle setting image are the same. The display module is further configured to display a mowing path schematic diagram. The touch panel and the intelligent lawn mower are in detachable connection.

Figure 3:
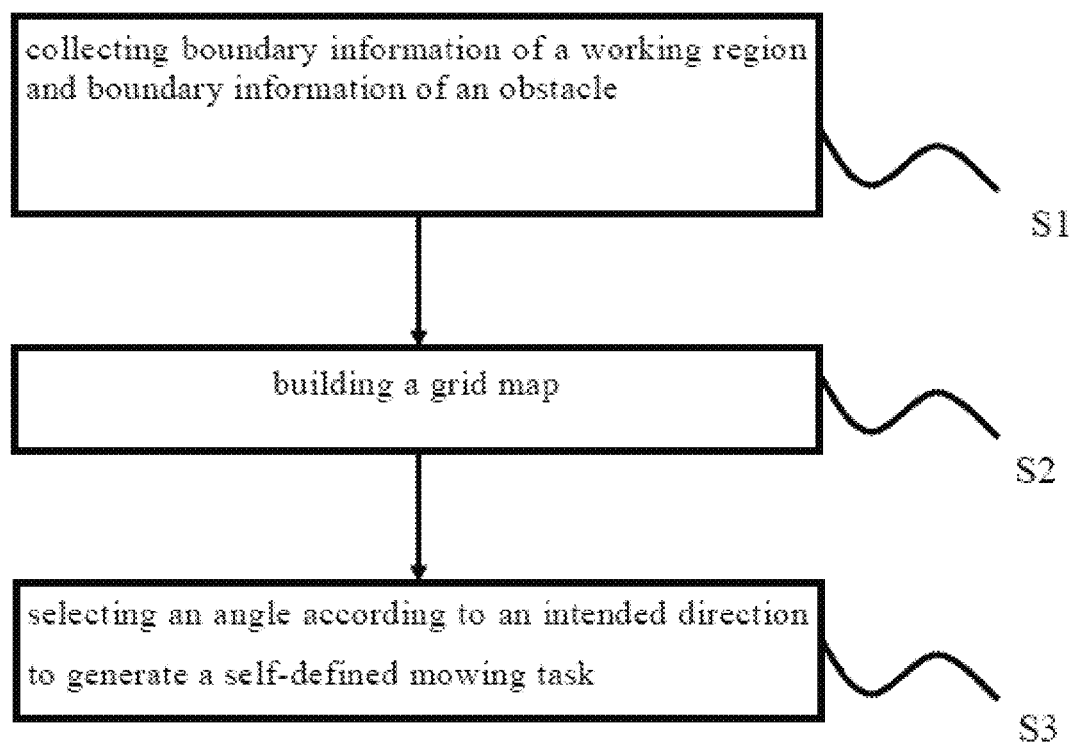
FIG. 3 is a flow chart of a path planning method for a lawn mower according to another preferred embodiment of the present disclosure.

Refer to FIG. 3, which is a flow chart of a path planning method for a lawn mower according to another preferred embodiment of the present disclosure. According to another preferred embodiment, the path planning method for the lawn mower includes the following steps.

In step S1, boundary information of a working region and boundary information of an obstacle are acquired to obtain accurate boundary information.

In step S2, a grid map is built.

In step S3, an angle in an intended direction is selected to generate a self-defined mowing task.

Figure 4:
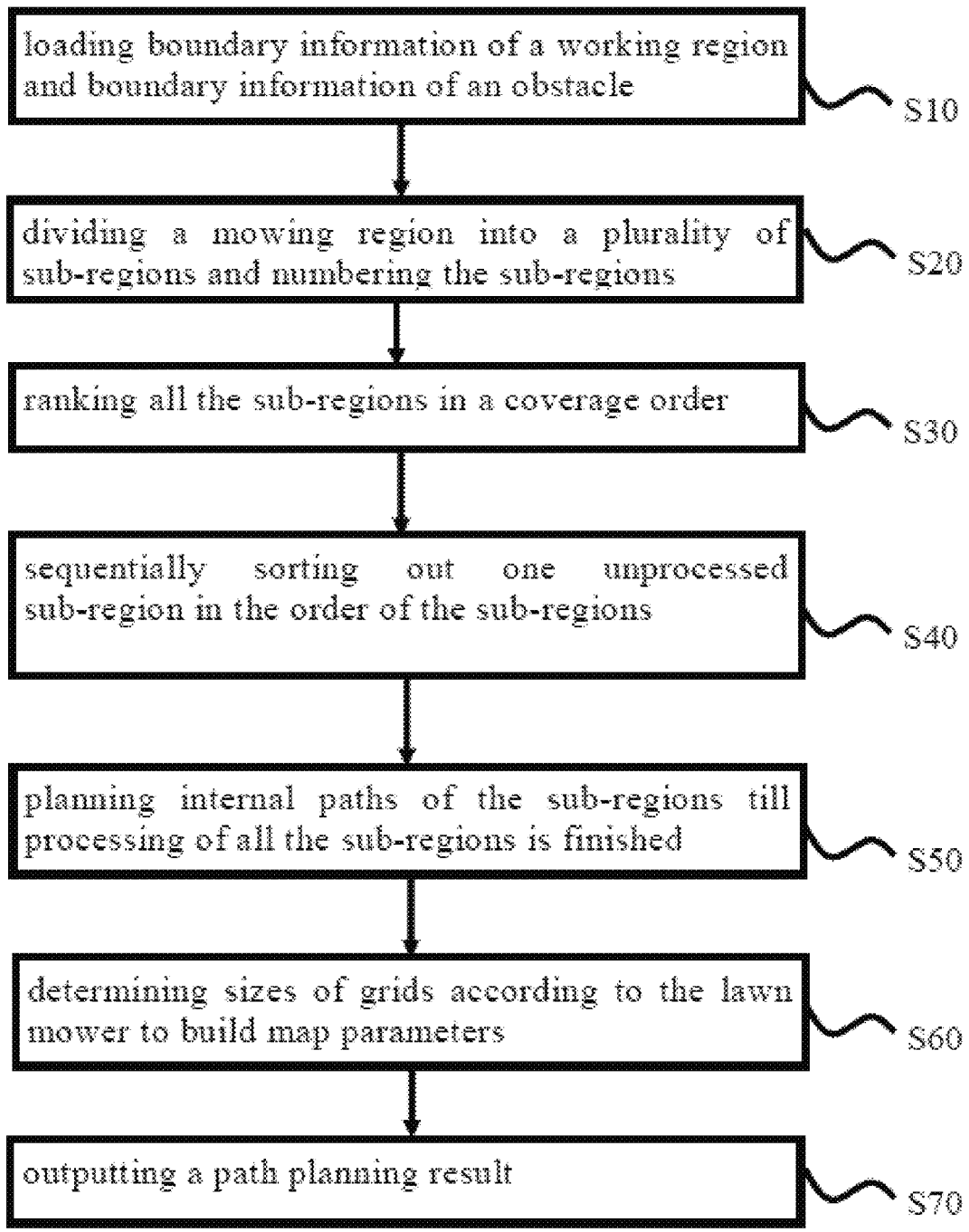
FIG. 4 is a flow chart of the path planning method for the lawn mower according to the preferred embodiment in FIG. 1.

In particular, further referring to FIG. 4, the path planning method for the lawn mower includes the following steps.

In step S10, boundary information of a working region and boundary information of an obstacle are loaded.

In step S20, a mowing region is divided into a plurality of sub-regions and the sub-regions are numbered.

In step S30, all the sub-regions are ranked in a coverage order.

In step S40, one unprocessed sub-region is sorted out sequentially in the order of the sub-regions.

In step S50, internal paths of the sub-regions are planned till processing of all the sub-regions is finished.

In step S60, sizes of grids are determined according to the lawn mower to build map parameters.

In step S70, a path planning result is output.

Figure 5:
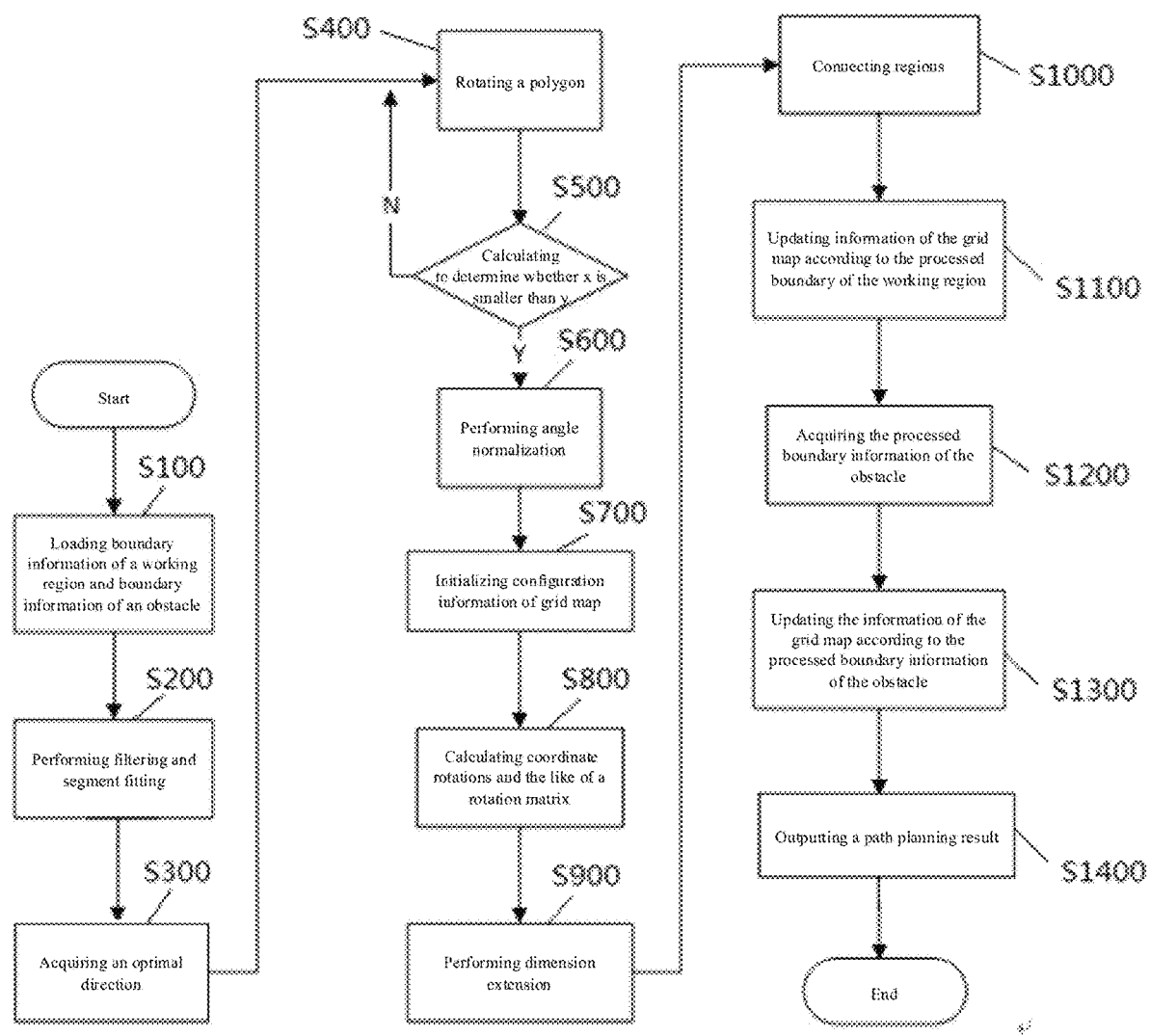
FIG. 5 is a flow chart of the path planning method for the lawn mower according to the preferred embodiment in FIG. 1.

Further, referring to FIG. 5, the path planning method for the lawn mower particularly includes the following steps.

In step S100, boundary information of a working region and boundary information of an obstacle are loaded.

In step S200, filtering is performed on all data, and fitting is performed on data fields to obtain relatively-ideal smoothed data.

In step S300, an optimal direction is acquired. In particular, a current data coordinate needs to be transformed into an internally processed grid coordinate when data of one closed curve are acquired. At this time, it is necessary to find one direction that may represent the whole closed curve. An optimal representation direction of the data of the entire curve can be acquired by putting in the data with a mathematical matrix library, forming a square or a rectangle by maximum and minimum points, building a coordinate of angular points and building a horizontal coordinate system.

In step S400, a polygon is rotated. In particular, one polygon is finally presented after fitting of the collected data as described above. The result of the fitting is the polygon composed of a plurality of linear segments. When the polygon is rotated, it is called a rotatable polygon.

In step S500, whether a coordinate value X is smaller than a coordinate value Y is judged. If not, the process returns to step S400; or if yes, step S600 is executed.

In step S600, angle normalization is performed. In particular, in the present preferred embodiment, by taking 180° as the maximum angle, complementation is performed on data over 180°, and then a percentage is figured out.

In step S700, configuration information of a grid map is initialized.

In step S800, coordinate rotations of a rotation matrix are calculated.

In step S900, dimension extension is performed. In particular, after the whole grid map is built, an outermost boundary of a drivable region is collected. However, during internal processing, the rationality and the security of a working region of a mowing robot need to be drawn into full consideration. An effective method is to perform dimension extension on the internal processing matrix. That is, the outermost layer is filled with one kind of invalid data to facilitate temporal operation.

In step S1000, regions are connected. In particular, a current point searches whether there is a similar point around based on a threshold value. If yes, corresponding setting is performed, and the current point continues to move to a next determined connected point. The connected point takes over the task and continues to search a point connected thereto without stop. If it is finally detected at certain time that the currently found point coincides with a start point, the whole query ends. At this time, an updated electronic map may be gained. The data then produce an entire region that looks connected.

In step S1100, information of the grid map is updated according to the processed boundary of the working region.

In step S1200, the processed boundary information of the obstacle is acquired.

In step S1300, the information of the grid map is updated according to the processed boundary information of the obstacle.

In step S1400, a path planning result is output.

It is assumed that the intelligent lawn mower has completed the boundary information of the working region and the boundary information of the obstacle. An automatic path planning method needs to include the following elements:

providing a human-computer interaction interface and performing personalization; providing a method for denoising boundary information; providing a boundary information classifying and segment fitting method; providing a polymerization process for building grids and calculating connected regions; providing externally self-defined angle information; and providing an improved path planning method to make an optimal path plan.

The method of the present disclosure is mainly implemented by running global planning on a complete intelligent mobile robot. The automatic path planning method needs at least five complete functional modules.

An upper-computer display module includes such computer displays with a human-machine interaction function as a mobile phone APP, an industrial control display and a tablet PC, and can provide rich human-machine interaction functions, including parameter configuration, signal acquisition, etc.

A database storage module provides safe and appropriate initialization data for an algorithm during initialization of the algorithm.

The automatic path planning method runs on an operation module. A CPU is controlled to perform high-frequency operations, such that accurate data are provided for a display phase of an upper computer as soon as possible.

A storage module stores original boundary data and accurately stores key data, including path planning data, the map, etc., after calculation.

A backstage management module supports all control logic by an internal method.

It is assumed that the boundary data have been stored in a complete data and storage mechanism at this time. All statuses of the robot are normal. The steps are as follows.

1. An interface of the upper computer is entered; all task information is loaded; and such relevant information as an internal boundary, an external boundary and parameter configuration of a current task is displayed by choice of an operator.

2. Human-machine interaction information of the operator is awaited on the interface.

3. The above boundary information is moved out from an internal memory, and information related to this signal in a database is deleted.

4. Boundary information of a current storage mechanism is loaded, and a path planning method is recalled for synchronous updating of data.

5. The boundary information and path planning information are reloaded, and the latest information is transferred into the upper computer for display.

Figure 6:
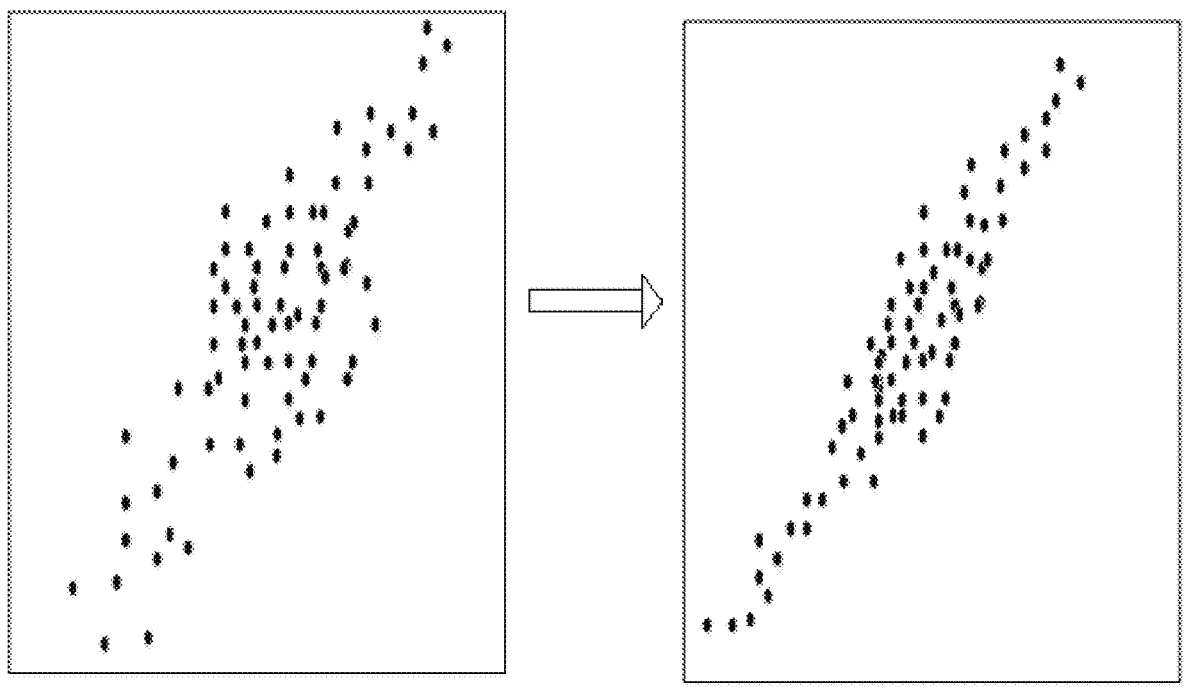
FIG. 6 is a schematic diagram showing smoothing of data information of a lawn mower.

Referring to FIG. 6, in the real situation, due to a complicated field environment, positioning data provided always have much noise. During running, the data are severe in non-linearity. However, the robot does not have a linear motion curve. Thus, the produced data form a complicated non-linear point set. Therefore, it is necessary to strictly smooth the data first, and an effective point set is extracted to reduce the effect of white noise as much as possible.

Figure 7:
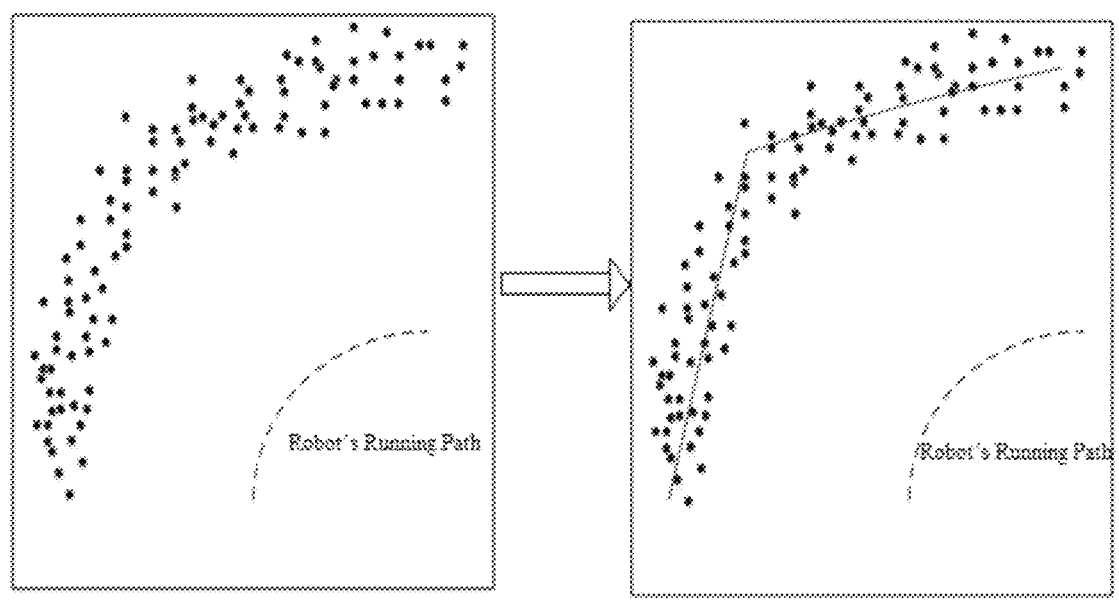
FIG. 7 is a schematic diagram showing minimum quadratic fitting of data of a lawn mower.

Referring FIG. 7, the filtered data need to be further processed by a classifying method. Since the data are very concentrated, it is not realistic to process each piece of data individually in the process of building the electronic map, and it is a waste of hardware resources. Therefore, the data are classified and segmented by the classifying method to obtain results in the figure. At last, a grid map is built as shown by the results in the figure.

According to the size and the location of the obstacle, the entire mowing region is divided into a plurality of rectangular (or rectangle-like) unit sub-regions, and the unit sub-regions are numbered to ensure that the number of units obtained by division is minimal and none of the units contains an obstacle. Attributes of each unit are marked. The division is helpful for unit ranking in the subsequent steps and path planning within the units.

The coverage order of all the units is arranged according to the sizes and locations of the units and their relative positions to neighboring units and obstacles. According to the order of the units, one unprocessed unit is selected sequentially, and the internal paths of the units are planned. Whether all the units have been processed is judged. If yes, path planning ends, or if not, one path is planned to ensure that the length of the path and the number of turns are minimized. Since all paths are composed of linear segments and turns, complete-coverage path planning ends.

Generally, an area of the mobile robot is used as the basis for selecting the sizes of the grids. Regarding the basis for selecting an intelligent lawn mower, in order to comprehensively reflect effective information of a working environment of the intelligent lawn mower, the fact that the sizes of the grids are half of the size of a robot is taken as a map building parameter.

The adopted method can well achieve the coverage rate, and particularly, at the boundary of the obstacle, a satisfactory coverage result is obtained. Thus, a self-defined automatic task path planning data set can be gained.

Figure 8:
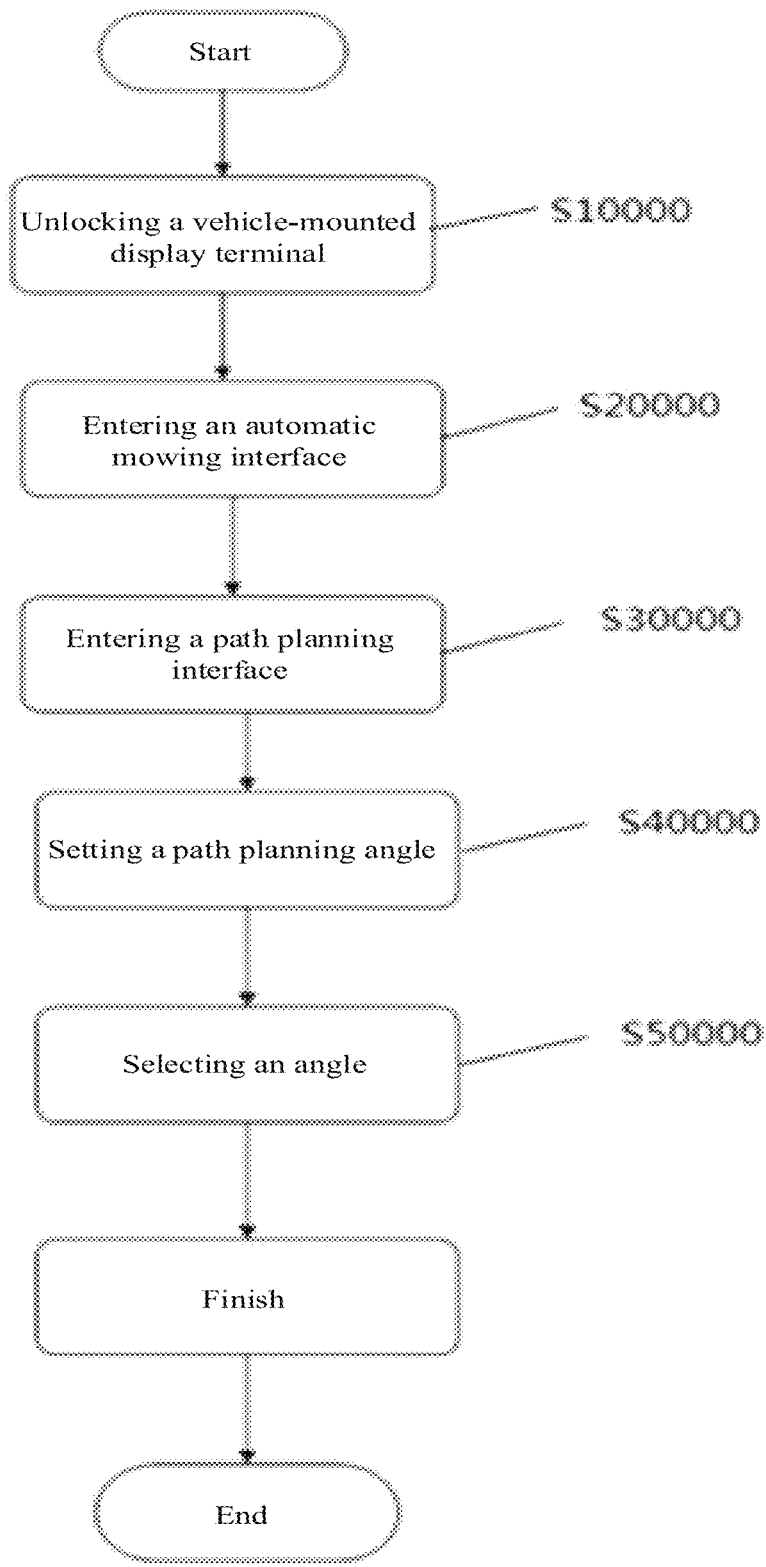
FIG. 8 is a flow chart of an operation method of a vehicle-mounted terminal.

Referring to FIG. 8, a planning process and result interact with a user through a vehicle-mounted display terminal. The vehicle-mounted display terminal includes a display and an input component and includes the following logic steps.

In step S10000, a user unlocks the vehicle-mounted display terminal.

In step S20000, the user clicks to enter an automatic mowing interface.

In step S30000, the user enters a path planning interface.

In step S40000, a path planning button is clicked on the automatic mowing interface for setting.

In step S50000, the user selects an angle on the interface.

A path planning graph after planning is displayed. In the shown planning schematic diagram, a direction, a start point and an end point of path planning are identified. After confirmation by the user, a path can be added for mowing operations.

Figure 9:
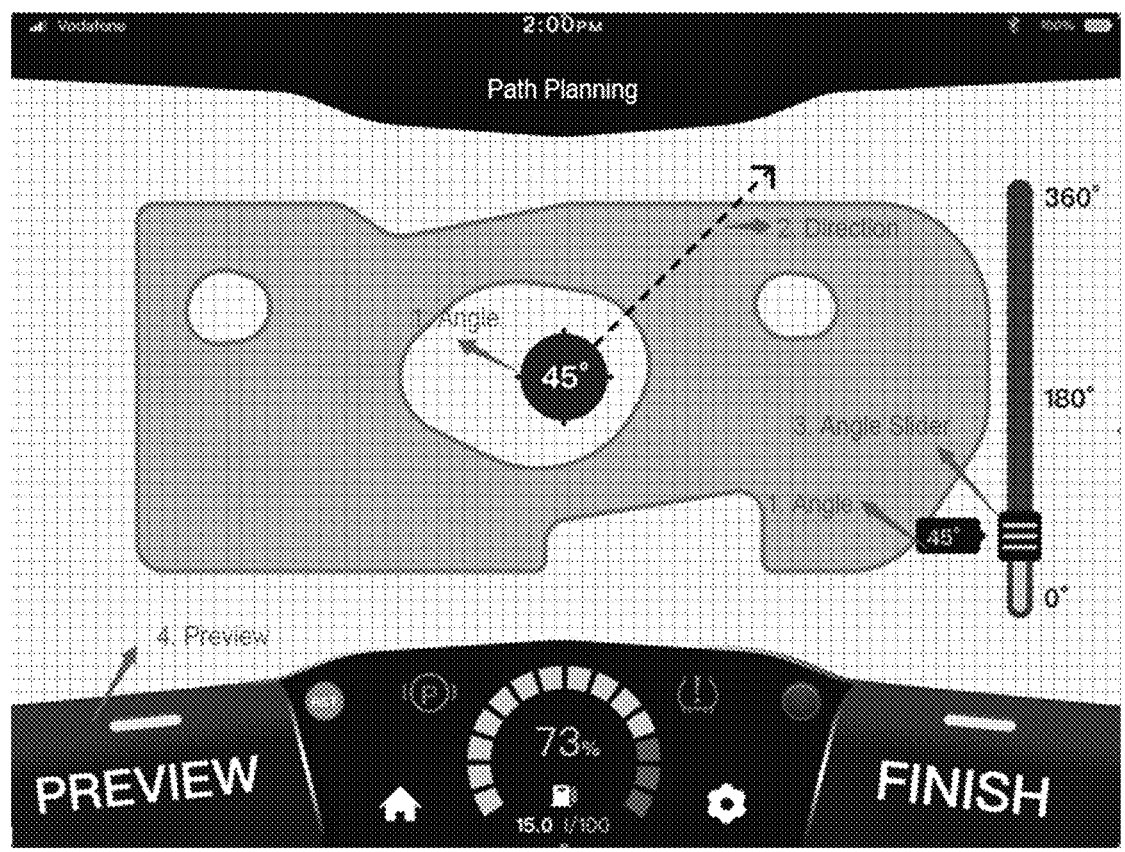
FIG. 9 is a schematic diagram of an operation interface for mowing path planning by a vehicle-mounted display terminal.

Continuously refer to FIG. 9, which is a schematic diagram of an operation interface for mowing path planning by a vehicle-mounted display terminal, and displays a schematic diagram of a region to be mowed, a path angle indicating image and a path angle setting image. An image constituted by a circle and a direction arrow in the middle of the operation interface is the path angle indicating image, and is configured to indicate angle information of the mowing path. The value 45° in the circle is the set mowing path angle. The direction arrow points corresponding to the angle value. The path angle setting image is located on the right side of the operation interface and includes an angle setting slider, angle prompt information and a sliding path. The user touches and moves the slider to set the angle of the mowing path. A marking graph in the operation interface further includes a preview button and a finish button, as well as such information as fuel capacity, tire pressure, setting and braking status of the lawn mower. In other embodiments, the path angle indicating image and the path angle setting image may be combined, such that one image has two functions. That is, the angle setting slider, the angle prompt information and the sliding path are omitted, and the angle of the mowing path is set by directly touching and rotating the direction arrow. Thus, the operation interface is simple and easy to understand, and is higher in friendliness.

Figure 10:
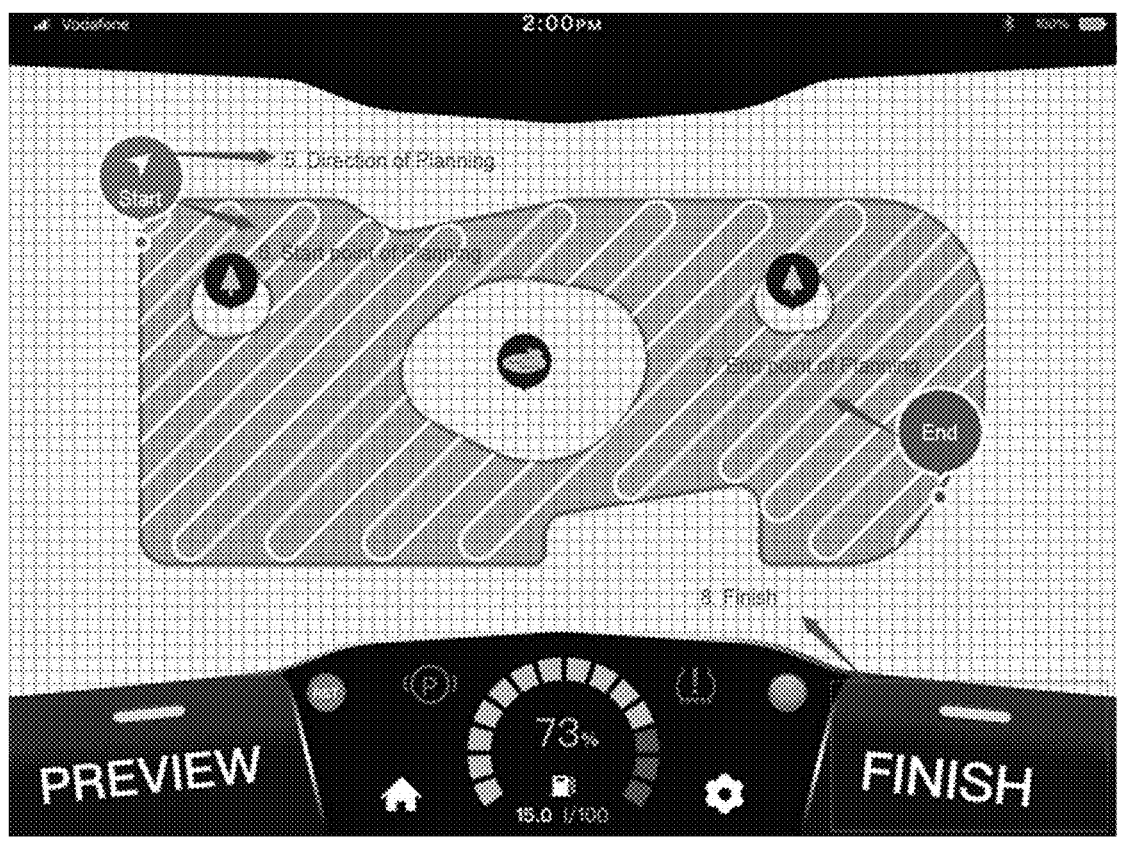
FIG. 10 is a schematic diagram of a mowing path after path planning by the vehicle-mounted display terminal.

FIG. 10 is a schematic diagram of a mowing path after path planning by a vehicle-mounted display terminal. A user touches a preview button in FIG. 9 to display a planned mowing path schematic diagram. In the mowing path schematic diagram, information of a path planning direction, a path start point and a path end point is marked. The user can touch a finish button to end manual setting of the path planning.

What is claimed is:

1. A path planning method for an intelligent lawn mower, the method comprising:
   starting a touch panel of the intelligent lawn mower;
   entering a path planning setting interface, which displays a schematic diagram of a region to be mowed, a path angle indicating image and a path angle setting image;
   receiving a touch input of a user with respect to the path angle setting image to set a path angle;
   adjusting, based on the set path angle, the path angle indicating image for display; and
   planning a path of the intelligent lawn mower based on the set path angle and a preset algorithm.

2. The path planning method for the intelligent lawn mower according to claim 1, wherein the path angle indicating image and the path angle setting image are the same.

3. The path planning method for the intelligent lawn mower according to claim 1, further comprising: displaying a mowing path schematic diagram on the touch panel based on the planned path.

4. The path planning method for the intelligent lawn mower according to claim 1, wherein the touch panel and the intelligent lawn mower are in detachable connection.

5. The path planning method for the intelligent lawn mower according to claim 1, wherein the schematic diagram of the region to be mowed is constituted by a plurality of grids of which the sizes are half to twice of the size of the lawn mower.

6. The path planning method for the intelligent lawn mower according to claim 5, wherein the schematic diagram of the region to be mowed comprises region boundary information and obstacle boundary information.

7. A path planning system for an intelligent lawn mower, the system comprising:
   a display module, configured to display a path planning setting interface, a schematic diagram of a region to be mowed, a path angle indicating image and a path angle setting image;
   an input module, configured to receive a gesture input of a user with respect to the path angle setting image by a touch panel of the intelligent lawn mower to set a path angle; and
   a controller, configured to adjust, based on the path angle set by the input module, the path angle indicating image for display, and to plan a path of the intelligent lawn mower based on a preset algorithm and the path angle.

8. The path planning system for the intelligent lawn mower according to claim 7, wherein the path angle indicating image and the path angle setting image are the same.

9. The path planning system for the intelligent lawn mower according to claim 7, wherein the display module is further configured to display a mowing path schematic diagram based on the planned path.

10. The path planning system for the intelligent lawn mower according to claim 7, wherein the touch panel and the intelligent lawn mower are in detachable connection.

* * * * *